United States Patent
Klie et al.

(10) Patent No.: US 10,634,814 B2
(45) Date of Patent: Apr. 28, 2020

(54) ADVANCED PARALLEL "MANY-CORE" FRAMEWORK FOR RESERVOIR SIMULATION

(71) Applicant: CONOCOPHILLIPS COMPANY, Houston, TX (US)

(72) Inventors: Hector M. Klie, Katy, TX (US); Hari H. Sudan, Richmond, TX (US)

(73) Assignee: ConocoPhillips Company, Houston, TX (US)

( * ) Notice: Subject to any disclaimer, the term of this patent is extended or adjusted under 35 U.S.C. 154(b) by 808 days.

(21) Appl. No.: 14/596,336

(22) Filed: Jan. 14, 2015

(65) Prior Publication Data

US 2015/0205005 A1 Jul. 23, 2015

Related U.S. Application Data

(60) Provisional application No. 61/928,737, filed on Jan. 17, 2014.

(51) Int. Cl.
*G01V 99/00* (2009.01)
*G06F 17/10* (2006.01)

(52) U.S. Cl.
CPC ............ *G01V 99/005* (2013.01); *G06F 17/10* (2013.01)

(58) Field of Classification Search
CPC ............................. G01V 99/005; G06F 17/10
See application file for complete search history.

(56) References Cited

U.S. PATENT DOCUMENTS

| | | | |
|---|---|---|---|
| 5,229,976 A | 7/1993 | Boyd et al. | |
| 5,706,194 A | 1/1998 | Neff et al. | |
| 7,933,758 B2 | 4/2011 | Gallagher, Jr. et al. | |
| 8,359,185 B2 * | 1/2013 | Pita | E21B 43/00 703/10 |
| 8,437,999 B2 | 5/2013 | Pita et al. | |
| 9,146,902 B2 * | 9/2015 | Dickenson | G06F 17/16 |
| 9,378,311 B2 * | 6/2016 | Pita | G06F 17/5009 |
| 9,396,162 B2 * | 7/2016 | Appleyard | G06F 17/12 |
| 9,418,180 B2 * | 8/2016 | Maliassov | G01V 9/00 |
| 2010/0082724 A1 | 4/2010 | Diyankov et al. | |
| 2011/0119040 A1 | 5/2011 | McLennan | |
| 2012/0035896 A1 | 2/2012 | Wu et al. | |
| 2012/0143578 A1 | 6/2012 | Fournier | |
| 2012/0203515 A1 | 8/2012 | Pita et al. | |

(Continued)

FOREIGN PATENT DOCUMENTS

EP 0297737 A2 1/1989

OTHER PUBLICATIONS

International Search Report for parent case, App. No. PCT/US15/11406, dated Apr. 20, 2015.

(Continued)

*Primary Examiner* — Aniss Chad

(74) *Attorney, Agent, or Firm* — Polsinelli PC

(57) ABSTRACT

The disclosure relates generally to a parallel computing framework designed to accelerate intensive kernel operations and address the complex physics in numerical reservoir simulations by effectively using the 'many-core' computing platform. Specifically, this Many-core Advanced Parallel Simulation (MAPS) uses heuristics to decide the optimal hardware configurations and optimal software components for a given problem's characteristics to efficiently design a model.

12 Claims, 2 Drawing Sheets

(56) References Cited

U.S. PATENT DOCUMENTS

| | | | |
|---|---|---|---|
| 2013/0090907 A1* | 4/2013 | Maliassov | G06F 17/5009 703/10 |
| 2013/0246030 A1 | 9/2013 | Usadi et al. | |
| 2014/0015841 A1* | 1/2014 | Killough | G01V 99/005 345/522 |
| 2014/0046993 A1* | 2/2014 | Castonguay | G06F 17/12 708/446 |
| 2014/0052965 A1* | 2/2014 | Sarel | G06F 9/4893 712/214 |
| 2014/0310722 A1* | 10/2014 | McGaughy | G06F 9/5066 718/105 |
| 2015/0213163 A1* | 7/2015 | Yang | G06F 17/5009 703/2 |

OTHER PUBLICATIONS

Liu, H., Yu, S., Chen, Z. J., Hsieh, B., & Shao, L. (Jan. 1, 2012). "Parallel Preconditioners for Reservoir Simulation on GPU." Society of Petroleum Engineers. doi:10.2118/152811-MS; 5 pgs.

Tchelepi, H., & Zhou, Y. (Feb. 18, 2013). "Multi-GPU Parallelization of Nested Factorization for Solving Large Linear Systems." Society of Petroleum Engineers. doi:10.2118/163588-MS; 19 pgs.

Bayat, M., & Killough, J. E. (Feb. 18, 2013). "An Experimental Study of GPU Acceleration for Reservoir Simulation." Society of Petroleum Engineers. doi:10.2118/163628-MS; 11 pgs.

Dogru, A.H., Fung, L. S. K., & Sindi, M. O. (Feb. 18, 2013). "Multi-Paradigm Parallel Acceleration for Reservoir Simulation." Society of Petroleum Engineers. doi:10.2118/163591-MS; 15 pgs.

\* cited by examiner

ADVANCED PARALLEL "MANY-CORE" FRAMEWORK FOR RESERVOIR SIMULATION

PRIORITY CLAIM

This application is a non-provisional application which claims benefit under 35 USC § 119(e) to U.S. Provisional Application Ser. No. 61/928,737 filed Jan. 17, 2014, entitled "ADVANCED PARALLEL "MANY CORE" FRAMEWORK FOR RESERVOIR SIMULATION," which is incorporated herein in its entirety.

FEDERALLY SPONSORED RESEARCH STATEMENT

Not Applicable

REFERENCE TO MICROFICHE APPENDIX

Not applicable.

FIELD OF THE DISCLOSURE

The disclosure relates generally to computerized numerical simulations of hydrocarbon reservoirs, and particularly to a parallel computing framework with an integrated set of software components designed to efficiently perform massive parallel computations for reservoir simulation. Heuristic rules will be used to determine the appropriate software and hardware configuration for efficient simulation.

BACKGROUND OF THE DISCLOSURE

Hydrocarbon reservoir simulation is one of the most powerful tools for guiding reservoir management decisions. Simulations are used for all stages, including planning early production wells, diagnosing problems with recovery techniques, and decisions regarding construction or overhaul of expensive surface facilities. Geologic complexity and the high cost of resource development continue to push reservoir simulation technology.

The earliest reservoir simulators date back to the 1930s when physical models were employed to understand behaviors of reservoirs that surprised the operator or misbehaved after years of production. Most often, the physical model was a vessel with clear sides that allowed viewing of the interactions between sand, oil and water. In addition to these physical models, electrical simulators relying on the analogy between flow of electrical current and flow of reservoir fluids were also available.

The early 1950s saw a transition from the physical models to analytically describing the reservoir using production information and other reservoir data. Thus, well-known principles such as the conservation of mass, fluid dynamics, and thermodynamic equations between phases were being applied to determine what was happening in the reservoir.

Generally, the equations governing a mathematical model of a hydrocarbon reservoir cannot be solved by analytical methods because the resulting partial differential equations are too complex, numerous, and nonlinear. Instead, numerical models were produced in a form amenable to solution by digital computers. Numerical models have been used since the 1950s to predict, understand, and optimize complex physical fluid flow processes in petroleum reservoirs.

In a numerical simulator, the reservoir is represented by a series of interconnected blocks, and the flow between the blocks is solved numerically. Most geologic models built for petroleum applications are in the form of a three-dimensional array of blocks (cells), to which geologic and/or geophysical properties such as lithology, porosity, acoustic impedance, permeability, and water saturation are assigned. The entire set of model blocks represents the subsurface earth volume of interest. The goal of the geologic-modeling process is to assign rock properties to each block in the geologic model. From there, the simulator itself computes fluid flow throughout the reservoir using partial differential equations that treat the reservoir volume as the numbered collection of blocks and the reservoir production period as specific time steps. Thus, the reservoir model is simulated in discretized in both space and time.

As computer power increased, engineers created bigger, more geologically realistic models requiring much greater data input. These realistic models, based on measurements taken in the field, including well logs, seismic surveys, structural and stratigraphic mapping and production history, often require advance computer systems for simulations.

Unfortunately, computerized modeling tends to be limited by the available software and computing architecture. In the early 2000s, the semiconductor industry settled on two main trajectories for designing quicker processors: multicore and many-core microprocessors. The multicore trajectory, e.g., central processing units (CPUs), maintains the execution speed of sequential programs while moving into multiple cores. In contrast, the many-core trajectory, e.g., CPUs and graphics processing units (GPUs), focuses on the execution throughput of parallel applications. Parallel computing operates on the principle that large problems like reservoir simulation can be broken down into smaller ones that are then solved concurrently.

A large performance gap has arisen between multicore and many-core microprocessors. As of 2009, the ratio between many-core GPU and multicore CPU for peak floating-point calculation throughput is about 10 to 1. This difference in computing ability is attributed largely to execution of instructions. The shift from serial processing to parallel systems is a direct result of the drive for improved computational performance.

Originally, GPUs were purely for pixel processing for gaming and similar industries. However, the advent of CUDA, Brook and OpenCL programming platforms has widened the use of GPUs to general-purpose calculations.

Current many-core technology utilizing GPUs on Single Instruction Multiple Data (SIMD) applications have shown some improvements in simulator performance, especially for seismic processing. However, for reservoir simulation, the major bottleneck is the need for both linear and nonlinear solvers, which are not parallel computation friendly.

While many existing simulation tools for linear and nonlinear solutions have been accelerated by the use of generic parallel software packages running on clusters of computers, the transition to many-core technology has more than surpassed the capabilities of these standard package solutions. Parallel programming requires a non-trivial distribution of task and data. Developers have to manually identify which simulation tools are appropriate for the GPU and to keep track of computations running on both the CPU and GPU cores. Additionally, developers have to manually initiate and manage data transfers between the two. This is a tedious and error prone process resulting in the developers having a hard time implementing their applications effectively.

In the case of reservoir simulation, the success of efficient GPU implementations is limited to spatial and temporal dependencies established by the discretized equations governing flow phenomena. Traditionally, each simulation may require a different approach to parallelization based on the physics of the problem (e.g., black-oil, compositional, thermal), the numerical formulation (e.g. degree of implicitness, type of spatial discretization and meshing), the input data (e.g., reservoir geometry, heterogeneity) and user supplied options (e.g., timestep control, flash calculations).

Most of the work in this area has focused on improving linear solver components. Solvers are used for the calculation of flow within the reservoir, which is the most difficult part of the simulation. US20120203515 discloses a heterogeneous (hybrid) computer environments composed of both CPUs and GPUs for processing iterative linear solutions. US20100082724 discloses a parallel-computing iterative solver that employs a preconditioning algorithm for modeling a large sparse system of linear system of equations.

Numerous factors are driving current production simulation planning to produce accurate results in the shortest possible time. These include remote locations, geologic complexity, complex well trajectories, enhanced recovery schemes, heavy-oil recover and unconventional gas. Operators now want accurate simulations of the field from formation discovery through secondary recovery and final abandonment. However, the current software and hardware configurations are limiting the turn around time of simulations.

Thus, what is needed in the art is a framework to perform the massive amounts of parallel computing inherent in reservoir simulations. Ideally, this apparatus would significantly reduce the turnaround time for computations. Furthermore, the framework would be capable of performing both linear and non-linear solver operations without affecting simulation time.

Upscaling has been around for quite some time. However, despite some important advances on this field, there are still a set of key questions open to make upscaling an ultimate solution for speeding up simulations. For example, here is a list of some issues:

1. There is no known upscaling method robust/reliable enough to hold for varying boundary conditions. That is, upscaling is usually carried out for a given set of flow boundary conditions, well location and rates and operating conditions. Once any of these conditions are changed during the life of a reservoir, the upscaled model may not be representative of the original fine flow model.
2. Upscaling presents important shortcomings to handle complex geologies and physics. The dynamic aspects of the reservoir have been handled to a certain extent for the purpose of upscaling. It is still unclear how to perform upscaling for compositional flow, chemical transport, combined flow and geomechanical effects or EOR processes in general.
3. Upscaling may introduce scaling effects in optimization, uncertainty quantification and decision making That is, selected models and decisions may be biased to scaling effects that are hard to characterize or afford in a study cycle time.
4. Even if upscaling is a suitable approach, there still a need to speedup fine scale simulations to construct, validate and verify the upscaled model.

It is clear that both upscaling and parallel computing should benefit if the underlying governing physics is understood despite the degree of uncertainty. In this case, upscaling can be use adaptively when is required (i.e., local and adaptive grid refinement) and parallel computing could be employed to balance and speedup the overall computation time. In the proposed invention, the idea is that parallel computing is used in a "smart" way in the form of hybrid computing and adaptive algorithms with the aid of GPUs.

SUMMARY OF THE DISCLOSURE

The present disclosure relates to a parallel computing framework and method of using such for numerical reservoir simulations. In particular, the framework is a Many-core Advance Parallel Simulation (MAPS) computing platform with an integrated set of software components specifically designed to efficiently perform massive parallel computations. Furthermore, MAPS has a heterogeneous processor with a plurality of CPUs and GPUs. For maximum efficiency, heuristics decide the optimal configuration of simulation parameters for the best performance and scalability by effectively using both CPU and GPU hardware platforms. Adaptive strategies are incorporated to dynamically modify the hardware configuration as the numerical simulation progresses. It is expected that MAPS will accelerate the intensive kernel operations in parallel computing and address the complex physics in numerical reservoir simulations.

One novel aspect of the present disclosure is the smart integration of all intensive computing elements typically involved in reservoir simulation. This facilitates flexible computational solutions that adapt to the characteristics of the problem being modeled. Thus, MAPS has a built-in intelligence for automatically selecting the hardware and software for an optimal simulation approach and for dynamically changing this selection over the course of simulation.

Furthermore, smart integration allows for the encapsulation of many time-consuming operations into a single software solution. This can include linear solver iterations, mass and volume balance operations, time stepping operations, and strategies to dynamically adapt the model according to the evolving physics. These types of solutions have not yet been offered with current many-core technology.

Additionally, the smart integration will enable the simulation tools to automatically adapt to the next generation of parallel hardware. This will overcome the current problems of implementing applications to newer hardware.

An advantage of the smart integration is the reduction in turnaround time from days to hours for complex compositional and thermal simulations. Because this disclosure provides an integrated parallel solution specifically tailored for reservoir simulations on many-core platforms, there is a significant reduction in simulation time. This has immediate implications in the decision-making process involved in reservoir management, optimizations, and uncertainty assessments since it provides the possibility to refine and analyze a wider set of possible scenarios.

Traditionally, reservoir simulations, especially parallel simulation, have been performed using shared memory parallel machines such as, for example, networked multiple-CPU/multiple-core desktop machines that are available today. However, the many-core technology used here allows for a single, portable system to be used to carry out the complex calculations.

FIG. 1 details the steps taking by MAPS during a typical reservoir simulation. First, physical information about the reservoir (porosity, seismic data, etc.) is uploaded to form a geological model of the subterranean surface. This reservoir information includes, but is not limited to, well logs, seismic surveys, structural and stratigraphic mapping and production history. The geological model is depicted as a set of interconnected blocks with as fine of detail as possible. Thus, the more physical information available, the more detailed and accurate the blocks.

Time-wise, the numerical simulation of a geological model is limited by the details of the block. The more information used in this model, more computer power and iterations are needed. Fine-detailed blocks are helpful to capture the heterogeneity within a specific area of the reservoir. However, coarse-scale models (less detailed blocks) are normally used because simulation occurs in a reasonable time and the larger model is needed to appropriately understand the interplay over the entire reservoir. Much information is lost when upscaling from fine-detail to coarse-detail blocks.

An advantage of MAPS is the ability to construct a full field model with fine-scale grid blocks. The fine-detailed blocks are capable of being upscaled without losing the detail and without increasing simulation time. Essentially, a large number of fine-detailed blocks are being used in the simulation.

Once the geological model is complete, a predetermined equation set is applied to each block depending on the physics model being simulated. For instance, compositional simulations solve for a different set of equations than a black-oil simulation. Then, algorithms will be applied to determine the most efficient method of simulating flow in the geological model.

As mentioned above, heuristics will be used to determine how and when each software component is used as well as what hardware configuration is necessary to achieve maximum efficiency. The objective of a heuristic search is to quickly produce a solution that is good enough for solving the problem at hand. This solution may not be the best of all the actual solutions to the problem, or it may simply approximate the exact solution. But it is still valuable because finding it does not require a prohibitively long time.

Here, heuristics are implemented as part of the MAPS framework to intelligently choose the most efficient and robust combination of parameters to perform equation solutions, thermodynamic calculations and time stepping on a given simulation time step. This also includes adapting the hardware configuration as the numerical simulation progresses.

MAPS is a heterogeneous many-core processor that has a plurality of CPUs and GPUs capable of performing calculations in parallel and serial. As the simulation progresses, the number or ratio of CPUs to GPUs many need to change. Here, adaptive strategies are coupled with the heuristic searches to efficiently incorporate changes in the hardware configuration without delaying the simulation.

In one embodiment of the present disclosure, multiple CPUs are combined with multiple GPUs on the many-core processor. The desired ratio of CPUs to GPUs is generally 1:10 for most parallel computations. Generally, 5-50K CPUs and GPUs will be used, preferably 10-20K and most preferably 15K. However, the heuristic search can select any combination of the CPUs and GPUs for the simulator.

The present disclosure takes advantage of parallel standardizations programmers (OpenMP, MPI, OpenCL, CUDA) to incorporate the next generation of computing hardware.

The preferred MAPS unit is modular and portable as opposed to other heterogeneous systems that typical require networking of multiple computer systems. In one embodiment, the combination of the CPUs and GPU is located in a single unit. However, larger computer systems with multiple units are also possible with the current disclosure.

The heuristic search will begin by determining the hardware configuration to use for the simulator based on the un-processed reservoir model. Depending on the type and number of equations, more GPUs than CPUs may be necessary for a given reservoir simulation. As the software components solve the various equation sets numerically representing the reservoir model, the heuristic search dynamically modifies and adapts the original hardware configuration to meet the demands of the numerical simulator.

FIG. 2 displays a generic GPU/CPU architecture for MAPS. The GPU architecture is based on a highly multi-threaded SIMD paradigm. Specifically, the same program, called a kernel, is running on GPU cores and is executed by each GPU thread but with different data. A CPU launches the sequence of kernels to allow the computationally intensive operations to be executed in the GPU. A parallel standardizations programmer such as OpenMP, MPI, OpenCL, and CUDA will provide the level of abstraction required to be able to handle the hierarchy of threads, memory, and synchronization instructions.

The disclosure also consists of an integrated set of software components, particularly solvers, thermodynamic calculations, adaptive and reduced modeling strategies. These components are useful for addressing the simulation physics for black-oil, compositional and thermal numerical simulation models.

Simulation software has been around for decades. Even though a number of larger companies have developed in-house systems, many vendors offer commercial available simulating software packages that range from stand-alone programs to integrated suites. The ECLIPSE line of reservoir simulators from Schlumberger offers a robust set of numerical solutions for the entire spectrum of reservoir simulation. There are also a series of add-on options to tailor the ECLIPSE simulator to specific reservoir properties. Halliburton offers the Landmark Reservoir simulation suite. Both lines of simulation software can be used with parallel computing modes. In the present disclosure, commercially available software packages for the most common physics models (black-oil, compositional and thermal) being simulated is installed on the MAPS framework. The heuristic search works independently of the software and chooses the correct software components based on the specific codes for each component.

It is possible to break the many-core processor into multiple configurations and have multiple reservoir properties being numerically solved at the same time, i.e. one GPU/CPU configuration may solve mass calculations while a different GPU/CPU configuration in the same system is solving phase behavior calculations.

The proposed MAPS framework has the potential to be applied on a wide range of reservoir simulation problems ranging from multiphase to complex compositional/thermal/chemical simulations that will become affordable to tackle the inevitable advent of 'many-core' technology.

In another embodiment, the MAPS platform is connected to a display unit for viewing the results of the numerical simulations. Any commercially available display unit compatible with computerized systems can be used.

The term "framework" as used herein, denotes a design for a software system. This is not to be confused with the term "platform" which is a hardware architecture or software framework for running software. However, both terms can apply to MAPS.

The term "heuristics" or "heuristic rules" or "heuristic search" are used interchangeable to mean the set of instructions used to decide which software components are necessary for simulating the reservoir, the order and timing of solving numerical simulation using the software components and the hardware configuration needed for the most efficient and less time-consuming simulation.

The term "many-core" as used herein denotes a computer architectural design whose cores include CPUs and GPUs. Generally, the term "cores" has been applied to measure how many CPUs are on a giving computer chip. However, graphic cores are now being used to offset the work of CPUs. Essentially, many-core processors use both computer and graphic processing units as cores.

The term "thread" as used herein denotes a process that does not have a full stack of memory associated for it. The thread is tied to a parent process, and is merely an offshoot of execution. Typically, thread processes must run on the same computer, but can execute simultaneously on separate cores of the same node.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| | |
|---|---|
| CPU | Central processing unit |
| GPU | Graphics processing unit |
| BLAS | Basic Linear Algebra Subroutines |
| CUBLAS | Compute Unified Basic Linear Algebra Subprograms |
| CUDA | Compute Unified Device Architecture |
| GMRES | Generalized minimal residual method |
| FGMRES | Flexible GMRES |
| MAPS | Many-core Advance Parallel Simulation |
| SIMD | Single Instruction Multiple Data |

DETAILED DESCRIPTION

The disclosure provides a novel parallel computing framework for oil reservoir numerical simulations. Specifically, heuristics are used to intelligently choose the right hardware configuration and software components to significantly reduce the turnaround time of complex simulations. An adaptive strategy is applied to dynamically modify the hardware and software components used in the simulation as it progresses.

One novel aspect of the current disclosure is the smart integration of the various software and hardware components normally used for simulation models. The goal of any simulator is to integrate pieces of information as accurately as possible to construct a global picture. In the oil and gas industry, the complex nature of the simulation usually limits the amount of information capable of being processed by the simulator. However, parallel many-core computing frameworks are capable of processing multiple pieces of information simultaneous. The present disclosure capitalizes on this aspect of parallel many-cores to integrate a set of software components that are commonly used in reservoir simulators but have yet to be available for use simultaneous. Heuristic rules are applied to the system to intelligently decide what hardware configuration and what software components should be used in a given simulation and when they should be used.

Figure 1:
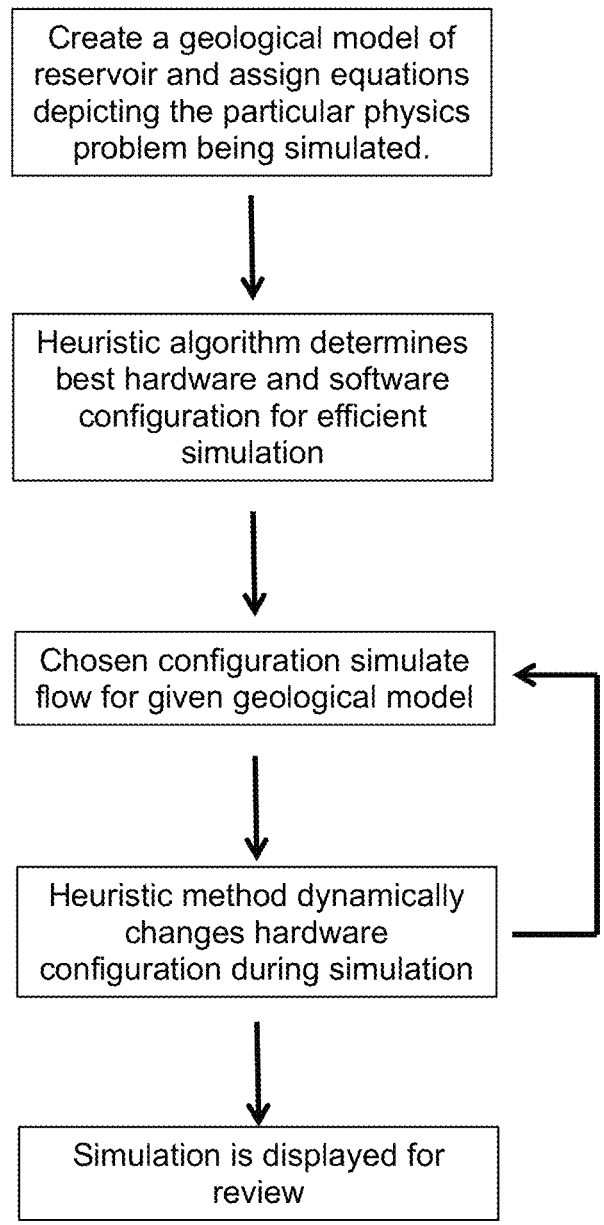
FIG. 1. Block diagram of depicting steps taken in the MAPS simulations.
Figure 2:
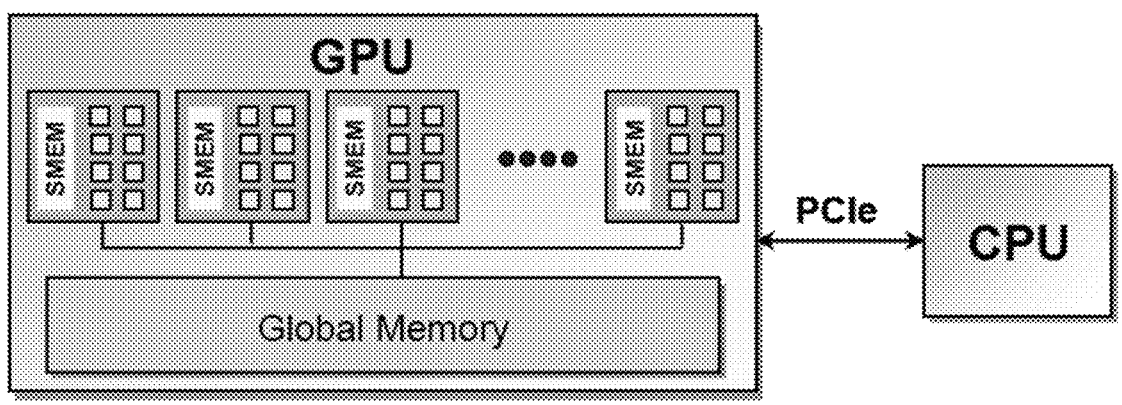
FIG. 2. Basic overview of the GPU architecture for MAPS.

The present disclosure is exemplified with respect to FIGS. 1 & 2 and the following descriptions. However, these are exemplary only, and the methods can be broadly applied to any simulation model that involves complex equations. The following descriptions are intended to be illustrative only, and not unduly limit the scope of the appended claims.

Maps v. Intel Nehalem Multi-Core CPU

The linear solver component of the MAPS framework was tested on real simulation models. The computation time and results were compared with simulation models performed on Intel Nehalem Core i7 multi-core CPU technology. The models are based off of a ConocoPhillips owned reservoir. The actual production and completion data was used to determine the accuracy of the simulations.

The reservoir model was 50 m thick on the edges and dips to 25 m thick in the middle. The reservoir was modeled with a grid discretization of 5 m×5 m×1 m, where the X and Y axes of the grid blocks measured 5 m and the average depth of each grid block was 1 m. The model consisted of 76 layers and contained a total of 2.89 million active grid blocks.

The linear solver was a flexible variant of GMRES, namely FGMRES. FGMRES allows for using variable preconditioning in each of the iterations and can handle nested type of solutions in a more stable fashion. Implementation of FGMRES relied on CUBLAS, which is a highly optimized BLAS library for GPUs specially written in CUDA.

The heuristic rules of MAPS decided on a 30-core configuration per simulation. The entire study was completed in 13 days from the start of the simulation run.

MAPS outperformed the Core i7. The MAPS simulation provided a more accurate model when compared to actual recovery and completion data obtained from the real reservoir. Furthermore, MAPS had a much quicker turnaround time than Core i7.

Maps on GPU Hybrid Platform

To illustrate MAPS' ability to adapt to the next generation of parallel hardware, a real simulation model was tested on the latest GPU Hybrid platforms. Again, the simulation model was compared with the actual production and completion data of the reservoir used to develop the simulation.

As expected, MAPS was able to successful simulate the reservoir using the newest hardware. The heuristics facilitated the adaptability of the software components to the hardware. This will greatly reduce the time and effort that is normally required to update software code to work with newer hardware.

REFERENCES

The following references are incorporated by reference in their entirety:
1. U.S. Pat. No. 5,229,976, Boyd & Hanson, "Method for creating a numerical model of the physical properties within the earth." Conoco Inc. (1991).
2. U.S. Pat. No. 5,706,194, Neff, et al., "Non-unique seismic lithologic inversion for subterranean modeling." Phillips Petroleum Co. (1995).
3. U.S. Pat. No. 7,933,758, Gallagher, et al., "Method and apparatus for geomodel uplayering." ConocoPhillips Co. (2006).
4. U.S. Pat. No. 8,437,999, WO2012109063, Pita, et al., "Seismic-Scale Reservoir Simulation of Giant Subsurface Reservoirs Using GPU-Accelerated Linear Equation Systems." Saudi Arabian Oil Co. (2011)
5. US20100082724, Diyankov, et al., "Method For Solving Reservoir Simulation Matrix Equation Using Parallel Multi-Level Incomplete Factorizations." ExxonMobil Upstream Res. Co. (2008).
6. US20110119040, Mclennan, "Attribute importance measure for parametric multivariate modeling." ConocoPhillips Co. (2009).
7. US20120035896, Wu, et al., "Reservoir upscaling method with preserved transmissibility." ConocoPhillips Co. (2010).
8. EP0297737, Bakker & Johnson, "Three-dimensional iterative structural modeling of seismic data." Conoco Inc. (1988).
9. Liu, H., Yu, S., Chen, Z. J., Hsieh, B., & Shao, L. (2012, Jan. 1). "Parallel Preconditioners for Reservoir Simulation on GPU." Society of Petroleum Engineers. doi:10.2118/152811-MS.
10. Tchelepi, H., & Zhou, Y. (2013, Feb. 18). "Multi-GPU Parallelization of Nested Factorization for Solving Large Linear Systems." Society of Petroleum Engineers. doi:10.2118/163588-MS.
11. Bayat, M., & Killough, J. E. (2013, Feb. 18). "An Experimental Study of GPU Acceleration for Reservoir Simulation." Society of Petroleum Engineers. doi:10.2118/163628-MS.
12. Dogru, A. H., Fung, L. S. K., & Sindi, M. O. (2013, Feb. 18). "Multi-Paradigm Parallel Acceleration for Reservoir Simulation." Society of Petroleum Engineers. doi:10.2118/163591-MS.

The invention claimed is:

1. A method of simulation of a reservoir model, comprising:
receiving physical information about a reservoir, wherein the physical information includes at least one of well logs, seismic surveys, structural and stratigraphic mapping, and/or production history;
generating a reservoir geological model from the physical information, wherein the reservoir model comprises a plurality of blocks;
applying a predetermined equation set to each of the plurality of blocks depending on a physics model being simulated;
processing the reservoir model, by choosing one or more heuristic rules, the one or more heuristic rules determining a combination of one or more software components and one or more hardware components for the predetermined equation set for each of the plurality of blocks, wherein the one or more hardware components includes a plurality of central processing units (CPUs) and a plurality of graphics processing units (GPUs), the plurality of CPUs and the plurality of GPUs defining a ratio of CPUs to GPUs;
solving the predetermined equation set of each of the plurality of blocks serially and in parallel using the combination of the one or more software components and/or the one or more hardware components;
adjusting, dynamically, a quantity of CPUs within the plurality of CPUs and/or a quantity of GPUs within the plurality of GPUs, wherein the one or more heuristic rules determines the quantity of CPUs and the quantity of GPUs as the reservoir model is processed.

2. The method of claim 1, wherein the physics model is selected from black-oil, compositional, and/or thermal models.

3. The method of claim 1, wherein the one or more software components are selected from linear solver, non-linear solver, thermodynamic calculations, adaptive modeling strategies, and/or reductive model strategies.

4. The method of claim 1, wherein the ratio of CPUs to GPUs is constant.

5. The method of claim 1, wherein the ratio of CPUs to GPUs is variable.

6. The method of claim 1, wherein the predetermined equation set of each of the plurality of blocks is solved with the one or more software components.

7. A method for simulating a subsurface reservoir using a computer framework, the method comprising:
receiving one or more geological reservoir measurements onto a computer framework, wherein the computer framework has a hybrid hardware processor and one or more software components, the hybrid hardware processor having a plurality of central processing units (CPUs) and a plurality of graphics processing units (GPUs);
creating a static reservoir model using the one or more geological reservoir measurements, wherein the reservoir model comprises a plurality of interconnected blocks, each of the plurality of interconnected blocks are assigned one or more physical properties of the geological reservoir;
selecting a physics model to simulate flow through said static reservoir model;
assigning one or more equations to the plurality of interconnected blocks to represent the physics model;
applying a set of heuristic rules to determine a configuration of the hybrid hardware processor and the one or more software components for solving at least one specific parameter of the physics model and one or more geological reservoir measurements, wherein the configuration includes a number of the plurality of CPUs and/or a number of the plurality of GPUs;
applying the configuration of the hybrid hardware processor and the one or more software components to the reservoir measurements;
simulating the physics model by solving the equations; and
adjusting, dynamically, the number of CPUs within the plurality of CPUs and/or the number of GPUs within the plurality of GPUs by applying the set of heuristic rules as the physics model is simulated.

8. The method of claim 7, wherein the one or more software components are selected from linear solver, non-linear solver, thermodynamic calculations, adaptive modeling strategies, and/or reductive model strategies.

9. The method of claim 7, wherein a ratio of CPUs to GPUs is 1:10.

10. The method of claim 7, wherein a ratio of CPUs to GPUs is constant.

11. The method of claim 7, wherein a ratio of CPUs to GPUs is variable.

12. A method of simulation of a reservoir model, comprising:

receiving physical information about a reservoir, wherein the physical information includes at least one of well logs, seismic surveys, structural and stratigraphic mapping, and/or production history;

generating a reservoir geological model from the physical information, wherein the reservoir model comprises a plurality of blocks;

applying a predetermined equation set to each of the plurality of blocks depending on a physics model being simulated;

processing the reservoir model, by choosing one or more heuristic rules, the one or more heuristic rules determining a combination of one or more software components and one or more hardware components for the predetermined equation set for each of the plurality of blocks, wherein the one or more hardware components includes a plurality of central processing units (CPUs) and a plurality of graphics processing units (GPUs), the plurality of CPUs and the plurality of GPUs defining a ratio of CPUs to GPUs;

solving the predetermined equation set of each of the plurality of blocks serially and in parallel using the combination of the one or more software components and/or the one or more hardware components;

adjusting, dynamically, a quantity of CPUs within the plurality of CPUs and/or a quantity of GPUs within the plurality of GPUs as the reservoir model is processed, wherein the ratio of CPUs to GPUs is 1:10.

* * * * *